(12) United States Patent
Skubic et al.

(10) Patent No.: US 10,414,094 B2
(45) Date of Patent: Sep. 17, 2019

(54) REMOTELY-ADJUSTABLE PURGE STATION FOR USE IN ADDITIVE MANUFACTURING SYSTEMS

(71) Applicant: Stratasys, Inc., Eden Prairie, MN (US)

(72) Inventors: Robert L. Skubic, Chanhassen, MN (US); Logan R. Kiene, Minneapolis, MN (US); Joel E. Farley, Mendota Heights, MN (US); Benjamin L. Braton, Otsego, MN (US); James Flannigan, Roseville, MN (US); Joel Ostby, Edina, MN (US)

(73) Assignee: STRATASYS, INC., Eden Prairie, MN (US)

( * ) Notice: Subject to any disclaimer, the term of this patent is extended or adjusted under 35 U.S.C. 154(b) by 172 days.

(21) Appl. No.: 15/615,181

(22) Filed: Jun. 6, 2017

(65) Prior Publication Data

US 2017/0266891 A1 Sep. 21, 2017

Related U.S. Application Data

(63) Continuation of application No. 14/575,471, filed on Dec. 18, 2014, now Pat. No. 9,694,545.

(51) Int. Cl.
*B29C 67/00* (2017.01)
*B29C 64/35* (2017.01)
*B29C 64/106* (2017.01)
*B29C 64/20* (2017.01)

(52) U.S. Cl.
CPC ............ *B29C 64/35* (2017.08); *B29C 64/106* (2017.08); *B29C 64/20* (2017.08)

(58) Field of Classification Search
CPC ....... B29C 64/35; B29C 64/106; B29C 64/20; B29C 64/364; B29C 64/371; B29C 64/255

USPC .............................................. 425/73, 74, 75
See application file for complete search history.

(56) References Cited

U.S. PATENT DOCUMENTS

| 5,121,329 | A | 6/1992 | Crump |
| 5,169,081 | A | 12/1992 | Goedderz |
| 5,303,141 | A | 4/1994 | Batchelder et al. |
| 5,312,224 | A | 5/1994 | Batchelder et al. |
| 5,340,433 | A | 8/1994 | Crump |
| 5,503,785 | A | 4/1996 | Crump et al. |

(Continued)

FOREIGN PATENT DOCUMENTS

| WO | 2012070052 A1 | 5/2012 |
| WO | 2012085914 A1 | 6/2012 |

OTHER PUBLICATIONS

International Search Report and Written Opinion dated Jun. 25, 2014 for corresponding International Patent Application No. PCT/US2014/017915, filed Feb. 24, 2014.

*Primary Examiner* — Joseph S Del Sole
*Assistant Examiner* — Emmanuel S Luk
(74) *Attorney, Agent, or Firm* — Westman, Champlin & Koehler, P.A.

(57) ABSTRACT

A purge station assembly for use in an additive manufacturing system, which includes a purge station having a base bracket, a slide mount slidably engaged with the base bracket, and a contact head configured to clean a nozzle tip of a print head. The purge station assembly also includes a mechanism, such as a cable line, operably attached to the slide mount that allows an operator to mechanically move the slide mount relative to the base bracket from a location that is remote from the purge station.

20 Claims, 10 Drawing Sheets

(56) References Cited

U.S. PATENT DOCUMENTS

| | | | |
|---|---|---|---|
| 5,738,817 A | 4/1998 | Danforth et al. | |
| 5,764,521 A | 6/1998 | Batchelder et al. | |
| 5,866,058 A | 2/1999 | Batchelder et al. | |
| 5,900,207 A | 5/1999 | Danforth et al. | |
| 5,939,008 A | 8/1999 | Comb et al. | |
| 5,968,561 A | 10/1999 | Batchelder et al. | |
| 6,004,124 A | 12/1999 | Swanson et al. | |
| 6,022,207 A | 2/2000 | Dahlin et al. | |
| 6,054,077 A | 4/2000 | Comb et al. | |
| 6,067,480 A | 5/2000 | Stuffle et al. | |
| 6,070,107 A | 5/2000 | Lombardi et al. | |
| 6,085,957 A | 7/2000 | Zinniel et al. | |
| 6,129,872 A | 10/2000 | Jang | |
| 6,168,257 B1 * | 1/2001 | Aldrich | B41J 2/16547 347/32 |
| 6,228,923 B1 | 5/2001 | Lombardi et al. | |
| 6,257,517 B1 | 7/2001 | Babish et al. | |
| 6,547,995 B1 | 4/2003 | Comb | |
| 6,645,412 B2 | 11/2003 | Priedeman, Jr. et al. | |
| 6,685,866 B2 | 2/2004 | Swanson et al. | |
| 6,722,872 B1 | 4/2004 | Swanson et al. | |
| 6,730,252 B1 | 5/2004 | Teoh et al. | |
| 6,749,414 B1 | 6/2004 | Hanson et al. | |
| 6,790,403 B1 | 9/2004 | Priedeman, Jr. et al. | |
| 6,814,907 B1 | 11/2004 | Comb | |
| 6,869,559 B2 | 3/2005 | Hopkins | |
| 6,923,634 B2 | 8/2005 | Swanson et al. | |
| 6,976,627 B1 | 12/2005 | Culp et al. | |
| 6,998,087 B1 | 2/2006 | Hanson et al. | |
| 7,122,246 B2 | 10/2006 | Comb et al. | |
| 7,127,309 B2 | 10/2006 | Dunn et al. | |
| 7,172,715 B2 | 2/2007 | Swanson et al. | |
| 7,236,166 B2 | 6/2007 | Zinniel et al. | |
| 7,261,533 B2 | 8/2007 | Wrosz et al. | |
| 7,306,152 B2 | 12/2007 | Culp et al. | |
| 7,384,255 B2 | 6/2008 | LaBossiere et al. | |
| 7,481,647 B2 | 1/2009 | Sambu et al. | |
| 7,572,121 B2 | 8/2009 | Wrosz et al. | |
| 7,604,470 B2 | 10/2009 | LaBossiere et al. | |
| 7,625,200 B2 | 12/2009 | Leavitt | |
| 7,744,364 B2 | 6/2010 | Turley et al. | |
| 7,896,209 B2 | 3/2011 | Batchelder et al. | |
| 7,917,243 B2 | 3/2011 | Kozlak et al. | |
| 7,938,351 B2 | 5/2011 | Taatjes et al. | |
| 7,938,356 B2 | 5/2011 | Taatjes et al. | |
| 8,033,811 B2 | 10/2011 | Swanson et al. | |
| 8,070,473 B2 | 12/2011 | Kozlak | |
| 8,075,300 B2 | 12/2011 | Zinniel | |
| 8,153,182 B2 | 4/2012 | Comb et al. | |
| 8,221,669 B2 | 7/2012 | Batchelder et al. | |
| 8,226,395 B2 | 7/2012 | Pax et al. | |
| 8,282,380 B2 | 10/2012 | Pax et al. | |
| 8,287,794 B2 | 10/2012 | Pax et al. | |
| 8,465,111 B2 | 6/2013 | Swanson et al. | |
| 10,105,896 B1 * | 10/2018 | Lee | B08B 1/008 |
| 2005/0129941 A1 | 6/2005 | Comb et al. | |
| 2007/0003656 A1 | 1/2007 | LaBossiere et al. | |
| 2007/0228590 A1 | 10/2007 | LaBossiere et al. | |
| 2009/0035405 A1 | 2/2009 | Leavitt | |
| 2009/0173443 A1 | 7/2009 | Kozlak et al. | |
| 2009/0263582 A1 | 10/2009 | Batchelder | |
| 2009/0273122 A1 | 11/2009 | Batchelder et al. | |
| 2009/0273630 A1 * | 11/2009 | Pan | B41J 2/16538 347/33 |
| 2009/0274540 A1 | 11/2009 | Batchelder et al. | |
| 2010/0096072 A1 | 4/2010 | Hopkins et al. | |
| 2010/0096485 A1 | 4/2010 | Taatjes et al. | |
| 2010/0096489 A1 | 4/2010 | Taatjes et al. | |
| 2010/0100224 A1 | 4/2010 | Comb et al. | |
| 2010/0283172 A1 | 11/2010 | Swanson | |
| 2010/0327479 A1 | 12/2010 | Zinniel et al. | |
| 2011/0074065 A1 | 3/2011 | Batchelder et al. | |
| 2011/0076495 A1 | 3/2011 | Batchelder et al. | |
| 2011/0076496 A1 | 3/2011 | Batchelder et al. | |
| 2011/0117268 A1 | 5/2011 | Batchelder et al. | |
| 2011/0121476 A1 | 5/2011 | Batchelder et al. | |
| 2011/0186081 A1 | 8/2011 | Dunn et al. | |
| 2011/0233804 A1 | 9/2011 | Batchelder et al. | |
| 2011/0241947 A1 | 10/2011 | Scott et al. | |
| 2012/0067501 A1 | 3/2012 | Lyons | |
| 2012/0068378 A1 | 3/2012 | Swanson et al. | |
| 2012/0070523 A1 | 3/2012 | Swanson et al. | |
| 2012/0162314 A1 | 6/2012 | Swanson et al. | |
| 2012/0164256 A1 | 6/2012 | Swanson et al. | |
| 2012/0258250 A1 | 10/2012 | Rodgers | |
| 2012/0304449 A1 | 12/2012 | Jackson et al. | |
| 2013/0075957 A1 | 3/2013 | Swanson et al. | |
| 2013/0078073 A1 | 3/2013 | Comb et al. | |
| 2013/0183623 A1 | 7/2013 | Shibazaki | |
| 2015/0158254 A1 * | 6/2015 | Chang | B08B 1/008 15/3 |
| 2015/0370160 A1 | 12/2015 | Yamada et al. | |
| 2016/0023467 A1 | 1/2016 | Din et al. | |
| 2016/0059270 A1 * | 3/2016 | Chen | B08B 3/02 134/111 |
| 2016/0202609 A1 | 7/2016 | Takiguchi et al. | |
| 2016/0257120 A1 * | 9/2016 | Yashima | B33Y 30/00 |
| 2016/0311173 A1 * | 10/2016 | Anderson, Jr. | B29C 64/35 |
| 2017/0015068 A1 * | 1/2017 | Ochi | B29C 67/0088 |
| 2017/0050374 A1 | 2/2017 | Minardi et al. | |
| 2017/0050381 A1 * | 2/2017 | Minardi | G05B 15/02 |
| 2017/0050388 A1 * | 2/2017 | Minardi | G05B 15/02 |
| 2017/0129181 A1 * | 5/2017 | Kunioka | B33Y 30/00 |
| 2017/0210068 A1 * | 7/2017 | Kunioka | B33Y 10/00 |
| 2017/0266876 A1 * | 9/2017 | Hocker | B33Y 30/00 |
| 2017/0266884 A1 * | 9/2017 | Maeda | G05B 19/4099 |
| 2018/0020683 A1 * | 1/2018 | Contractor | B33Y 10/00 426/231 |
| 2018/0178448 A1 * | 6/2018 | Kakuta | B29C 64/209 |
| 2018/0207859 A1 * | 7/2018 | Ochi | B29C 64/112 |
| 2018/0215917 A1 * | 8/2018 | Naruse | B29C 47/0014 |
| 2018/0236773 A1 * | 8/2018 | Hirata | B41J 2/16544 |

\* cited by examiner

REMOTELY-ADJUSTABLE PURGE STATION FOR USE IN ADDITIVE MANUFACTURING SYSTEMS

CROSS-REFERENCE TO RELATED APPLICATION(S)

This Application is a Continuation Application of U.S. patent application Ser. No. 14/575,471, filed Dec. 18, 2014, the contents of which are hereby incorporated by reference in their entireties.

BACKGROUND

The present disclosure relates to additive manufacturing systems for printing or otherwise building three-dimensional (3D) parts with layer-based, additive manufacturing techniques. In particular, the present disclosure relates to purge stations for use with print heads in additive manufacturing systems.

Additive manufacturing systems are used to print or otherwise build 3D parts from digital representations of the 3D parts (e.g., STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip or nozzle carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

During a build process, residual amounts of build and support materials may seep out of the corresponding extrusion tips after the extrusion processes are halted. These residual materials may interfere with subsequent extrusions, and may also potentially clog the extrusion tips. As such, it is desirable to periodically clean the extrusion head with a cleaning assembly to prevent material buildup in the extrusion tips. Current cleaning assemblies typically require precise calibrations during installation to ensure adequate alignment with the extrusion tips of the extrusion head.

Such calibrations are time consuming and require skillful technicians. Thus, when portions of a cleaning assembly are damaged and need replacement, the cleaning assembly typically requires recalibration before being operated. This delays the operation of the additive manufacturing system and may increase service costs. Thus, there is a need for a cleaning assembly that is efficient for cleaning extrusion heads, and is easy to repair with reduced recalibration requirements.

SUMMARY

An aspect of the present disclosure is directed to a purge station assembly for use in an additive manufacturing system. The purge station assembly includes a slide mount that is slidably moveable along a z-axis and a contact head mounted on the slide mount, and configured to clean a nozzle tip of a print head. The purge station assembly also includes a cable line operably attached to the slide mount that allows an operator to mechanically slide the slide mount along the z-axis from a location that is remote from the purge station. In some preferred embodiments, the purge station is mounted in a heatable chamber of the additive manufacturing system.

Another aspect of the present disclosure is directed to a purge station assembly for use in an additive manufacturing system having a print head, which includes a purge station, an operator panel, and a cable. The purge station includes a base bracket configured to be secured to a surface of the additive manufacturing system, and a wiper assembly that includes a slide mount slidably engaged with the base bracket, and a contact head configured to clean a nozzle tip of the print head. The operator panel is disposed at a remote location from the purge station, and includes an adjustment wheel. The cable line includes a first connection adapter operably attached to the slide mount at the purge station, a second connection adapter engaged with the adjustment wheel at the operator panel, and a cable interconnecting the first and second connection adapters, and configured to be moved in axial directions based on rotations of the adjustment wheel.

Another aspect of the present disclosure is directed to an additive manufacturing system that includes a chamber configured to be heated to one or more elevated temperatures, a print head configured to print three-dimensional parts in the chamber, and a purge station. The purge station includes a base bracket mounted in the chamber, and a wiper assembly that has a slide mount slidably engaged with the base bracket, and a contact head configured to clean a print head nozzle tip. The additive manufacturing system also includes a mechanism operably attached to the slide mount that allows an operator to mechanically move the slide mount relative to the base bracket from outside of the chamber.

Another aspect of the present disclosure is directed to a method for adjusting a contact head of a purge station mounted in an additive manufacturing system. The method includes rotating an adjustment wheel operably in a first rotational direction, where the adjustment wheel is mounted to a surface of the additive manufacturing system at a remote location from the purge station. The method also includes moving a cable in a first axial direction from the rotation of the adjustment wheel in the first rotational direction. and pressing a slide mount of the purge station upward from the axial movement of the cable in the first axial direction, wherein the contact head is operably mounted on the slide mount.

In some embodiments, the method may alternatively (or additionally) include rotating the adjustment wheel in a second rotational direction that is opposite of the first rotational direction, moving the cable in a second axial direction from the rotation of the adjustment wheel in the second rotational direction, and pulling the slide mount of the purge station downward from the axial movement of the cable in the second axial direction.

DEFINITIONS

Unless otherwise specified, the following terms as used herein have the meanings provided below:

The terms "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

The term "additive manufacturing system" refers to a system that prints, builds, or otherwise produces 3D parts and/or support structures at least in part using an additive manufacturing technique. The additive manufacturing system may be a stand-alone unit, a sub-unit of a larger system or production line, and/or may include other non-additive manufacturing features, such as subtractive-manufacturing features, pick-and-place features, two-dimensional printing features, and the like.

DETAILED DESCRIPTION

The present disclosure is directed to a system for printing 3D parts and support structures using a layer-based additive manufacturing technique, which includes a purge station having one or more wiper assemblies. The wiper assemblies are beneficial for cleaning the tips of print head nozzles after performing purge operations. As discussed below, to effectively clean the nozzle tips, the wiper assemblies are preferably to be mounted for vertical alignment with the nozzle tips. However, due to the high-precision movements of print head nozzle tips and their relative vulnerability to collision damage, this can be difficult and tedious to achieve.

Furthermore, height misalignments between the wiper assemblies and the nozzle tips can occur after initial installation, such as when switching out print heads. As such, as discussed below, the wiper assemblies are preferably adjustable from a remote panel, which allows an operator of the additive manufacturing system to independently adjust the height of each wiper assembly relative to the nozzle tips at any suitable time during and after initial installation. This can significantly increase the ease of use and effectiveness of the wiper assemblies during purge operations with the purge station.

Figure 1:
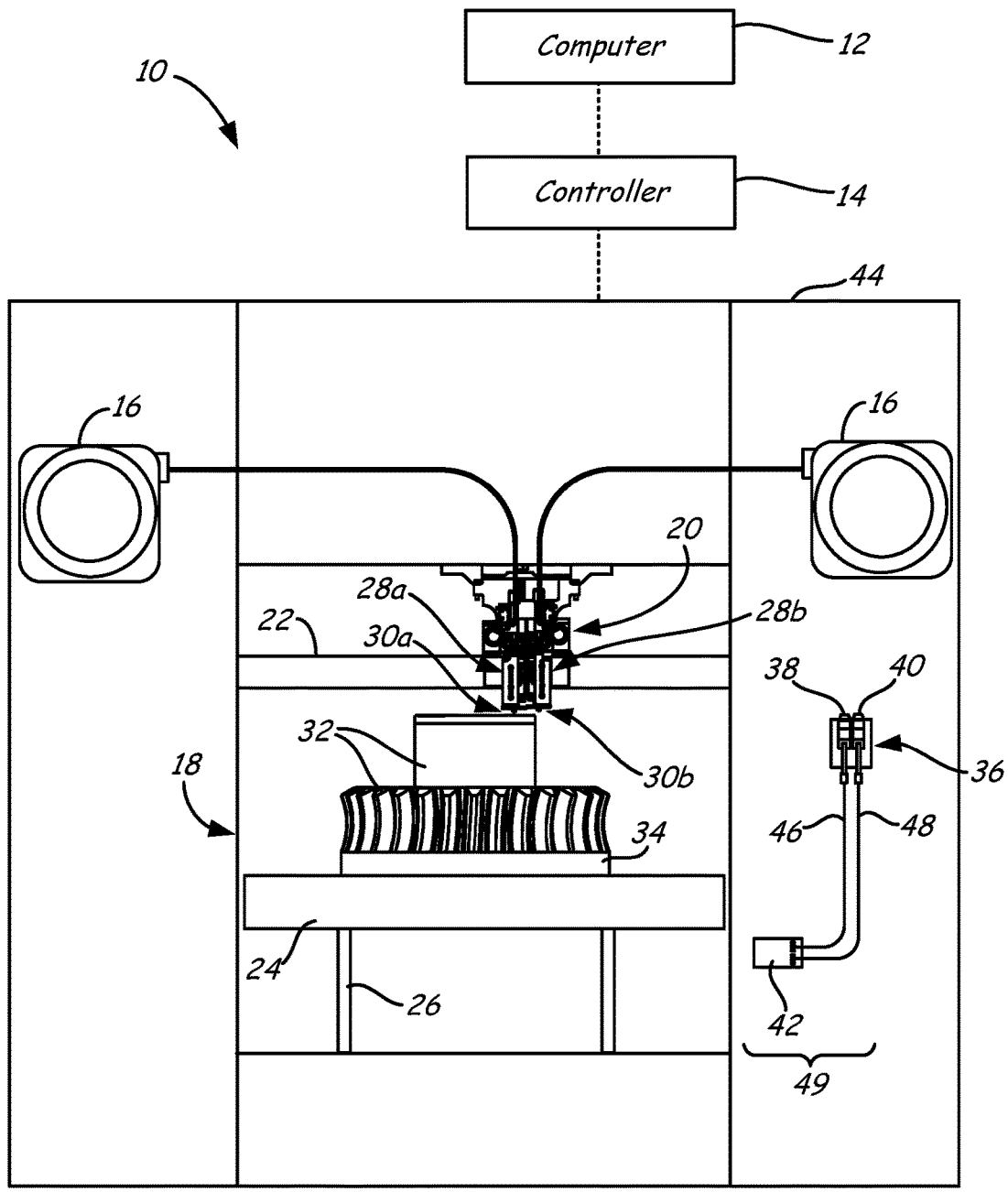
FIG. 1 is a front view of an additive manufacturing system for printing 3D parts and support structures with the use of a purge station of the present disclosure.

FIG. 1 illustrates system 10, which is an example additive manufacturing system for printing 3D parts and corresponding support structures with the use of a purge station of the present disclosure. As shown, system 10 may print the 3D parts and support structures from the part and support materials of consumable assemblies 16, using a layer-based, additive manufacturing technique. System 10 may also include host computer 12 and controller 14, where host computer 12 is preferably a computer-based system that interacts with system 10 via controller 14 to build the 3D objects and corresponding support structures. Suitable additive manufacturing systems for system 10 include extrusion-based systems developed by Stratasys, Inc., Eden Prairie, Minn. under the trademark "FDM".

System 10 may also include chamber 18, print head 20, head gantry 22, platen 24, and platen gantry 26. In the shown embodiment, chamber 18 is an enclosable environment that contains assemblies for printing 3D parts and support structures. Chamber 18 may be heated (e.g., with circulating heated air) to reduce the rate at which the part and support materials solidify after being extruded and deposited (e.g., to reduce distortions and curling), or otherwise maintained to provide a controlled environment. In alternative embodiments, chamber 18 may be omitted and/or replaced with different types of heated, cooled, and/or ambient build environments. For example, 3D part 28 and support structure 30 may be built in a build environment that is open to ambient conditions or may be enclosed with alternative structures (e.g., flexible curtains).

In the shown example, print head 20 is a dual-line/dual-tip extrusion head having liquefier line 28a with nozzle tip 30a (e.g., for the part material), and liquefier line 28b with nozzle tip 30b (e.g., for the support material). An example extrusion head for print head 20 is disclosed in Leavitt, U.S. Pat. No. 7,625,200. Print head 20 is supported by head gantry 22 for printing or otherwise building 3D parts and support structures (e.g., 3D part 32 and support structure 34) on platen 24 in a layer-by-layer manner.

While discussed herein as being used with a part material and a support material, print head 20 may be used to print any suitable materials from nozzle tips 30a and 30b, such as two different part materials. Additionally, in alternative embodiments, print head 20 may be replaced with two (or more) single-line/tip extrusion heads, such as disclosed in Swanson et al., U.S. Pat. No. 8,465,111. In these embodiments, each print head may include one of the liquefier lines 28a and 28b and one of the nozzle tips 30a and 30b.

Head gantry 22 is a guide rail system or other robotic system configured to move print head 20 in a horizontal x-y plane within build chamber 18 based on commands provided from controller 14. Platen 24 is a platform on which 3D part 32 and support structures 34 are built, and is moveable along a vertical z-axis by platen gantry 26, based on commands provided from controller 14.

During a printing operation, controller 14 may command head gantry 22 to move print head 20 in a predetermined tool-path pattern in the x-y plane. While moving, controller 14 may command print head 20 to extrude and deposit roads of the part material from nozzle tip 30a to form each layer of 3D part 32. Print head 20 may also be commanded to extrude and deposit roads of the support material from nozzle tip 30b to form each layer of support structure 34. In this case, the layers of support structure 34 may be built underneath overhanging portions or in cavities of 3D part 32 under construction, which are not supported by the part material itself.

Print head 20 typically extrudes and deposits the part and support materials in a back-and-forth manner. For instance, print head 20 may form one or more layers of 3D part 32 from liquefier line 28a and nozzle tip 30a, then switch to printing one or more layers for support structure 34 from liquefier line 28b and nozzle tip 30b, and then switch back to printing the layer(s) for 3D part 30 from liquefier line 28a and nozzle tip 30a. This back-and-forth pattern may then be repeated until 3D part 32 and support structure 34 are completed. During this interchange, one or both of nozzle tips 30a and 30b may be toggled or otherwise moved along the z-axis between a raised position and a lowered position, thereby switching between operating and stand-by modes.

The operating mode is preferably a mode in which a given liquefier line 28a or 28b is heated to its set point operating temperature(s) to generate a desired thermal gradient for melting the part or support material. In comparison, the stand-by mode is preferably a mode in which the given liquefier line 28a or 28b is cooled down from its operating mode to prevent its part or support material from thermally degrading, oozing or dripping out.

Typically, when liquefier line 28a is in its operating mode to print a layer of the 3D part, liquefier line 28b is preferably its stand-by mode, and vice versa. For example, after a layer for 3D part 32 is completed, controller 14 may command print head 20 to switch liquefier lines 28a and 28b such that liquefier line 28a is brought to its operating mode to print a layer of support structure 34, and liquefier line 28a is brought to its stand-by mode. Then, after one or more layers of support structure 34 are completed, controller 14 may command print head 20 to switch back such that liquefier line 28a is brought to its operating mode to print a layer of 3D part 32, and liquefier line 28b is brought to its stand-by mode.

When each liquefier line 28a and 28b is brought to its operating mode, it preferably undergoes a purge operation prior to printing the next layer. To accomplish this, system 10 also includes purge station 36. During a purge operation, controller 14 may command head gantry 22 to move print head 20 to purge station 36, where it can extrude a strand of the part or support material into a purge bucket (not shown).

This purge operation provides several desired functions. First, it frees any part or support material that may be adhered to the liquefier walls of the purged liquefier line 28a or 28b, and verifies that print head 20 can extrude the part or support material. It also removes any entrained gases and degraded materials in the purged liquefier line 28a or 28b, and brings the purged liquefier line 28a or 28b to a known operating state for printing the subsequent layer. for instance, the purge operation can bring a meniscus in the purged liquefier line 28a or 28b to a substantially known position and raising the internal temperature of the purged liquefier line 28a or 28b to a substantially steady-state condition.

It also removes variable ooze that may hang from nozzle tip 30 or 30b while the corresponding liquefier line 28a or 28b is idle or in its stand-by mode, and can account for variability of any voids in a tip pipe region of the nozzle. Additionally, for very low-volume-per-layer 3D parts 28, it may provide a minimum flow volume per layer to reduce the residence time-at-temperature for the part material.

After the purge operation, the purged nozzle tip 30a or 30b may also undergo tip cleaning operation at purge station 36. In particular, purge station 36 may include a pair of wiper assemblies 38 and 40 (best shown below in FIGS. 2-5), that can wipe off any excess material from the purged nozzle tip 30a or 30b. As discussed below, this can be accomplished by moving the purged nozzle tip 30a or 30b across the upper edge of the wiper assembly 38 or 40, effectively flicking and/or brushing off any excess material. An example of the wiping operation is discussed in Turley et al., U.S. Pat. No. 7,744,364, which is incorporated by reference to the extent that it does not conflict with the present disclosure.

As can be appreciated, nozzle tips 30a and 30b are very small in size and can be vulnerable to collision damage if care is not taken. As such, wiper assemblies 38 and 40 need to be accurately positioned along the z-axis. Otherwise, if they are too high, nozzle tips 30a and 30b could potentially be damaged due to collisions with wiper assemblies 38 and 40. On the other hand, if wiper assemblies 38 and 40 are too low, they will not effectively clean nozzle tips 30a and 30b.

These height misalignments may potentially occur due to mounting issues when installing purge station 36 to system 10. However, more typically, they occur when removing and replacing print head 20 in head gantry 22. Moreover, due to the toggling between operating and standby-by modes of liquefier lines 28a and 28b, the height of wiper assembly 38 can be different from the height of wiper assembly 40, requiring wiper assemblies 38 and 40 to be individually adjusted.

Purge station 36 may be positioned within system 10 at a designated purge area having the purge bucket. The purge area can, for example, be located within chamber 18, and is preferably offset from platen 24. This offset location prevents purge station 36 from interfering with build processes. However, it can also position purge station 36 such that it can be difficult to access for adjusting the heights of wiper assemblies 38 and 40. For instance, purge station 36 may be visually obscured within chamber 18, making it difficult for the operator to reach for adjustments. This can be further complicated when chamber 18 is heated, and can otherwise require an operator to wear protective gear (e.g., bulky gloves) when accessing purge station 36.

As such, in preferred embodiments, wiper assemblies 38 and 40 of purge station 36 can each be independently adjusted in height with the use of an operator panel 42. Panel 42 can be mounted at any suitable location of system 10, such as on an exterior housing of system 10 (referred to as housing 44) and/or in a panel compartment of housing 44. Preferably, panel 42 is retained outside of chamber 18, particularly when chamber 18 is heatable.

As shown, panel 42 is connected to purge station 36 with a pair of cable lines 46 and 48 that extend into chamber 18, and which are respectively used to adjust the heights of wiper assemblies 38 and 40. This allows an operator to adjust the heights of wiper assemblies 38 and 40 without having to open chamber 18 and reach inside. For ease of discussion, purge station 36, panel 42 and cable lines 46 and 48 are referred to collectively as purge station assembly 49.

Figure 2:
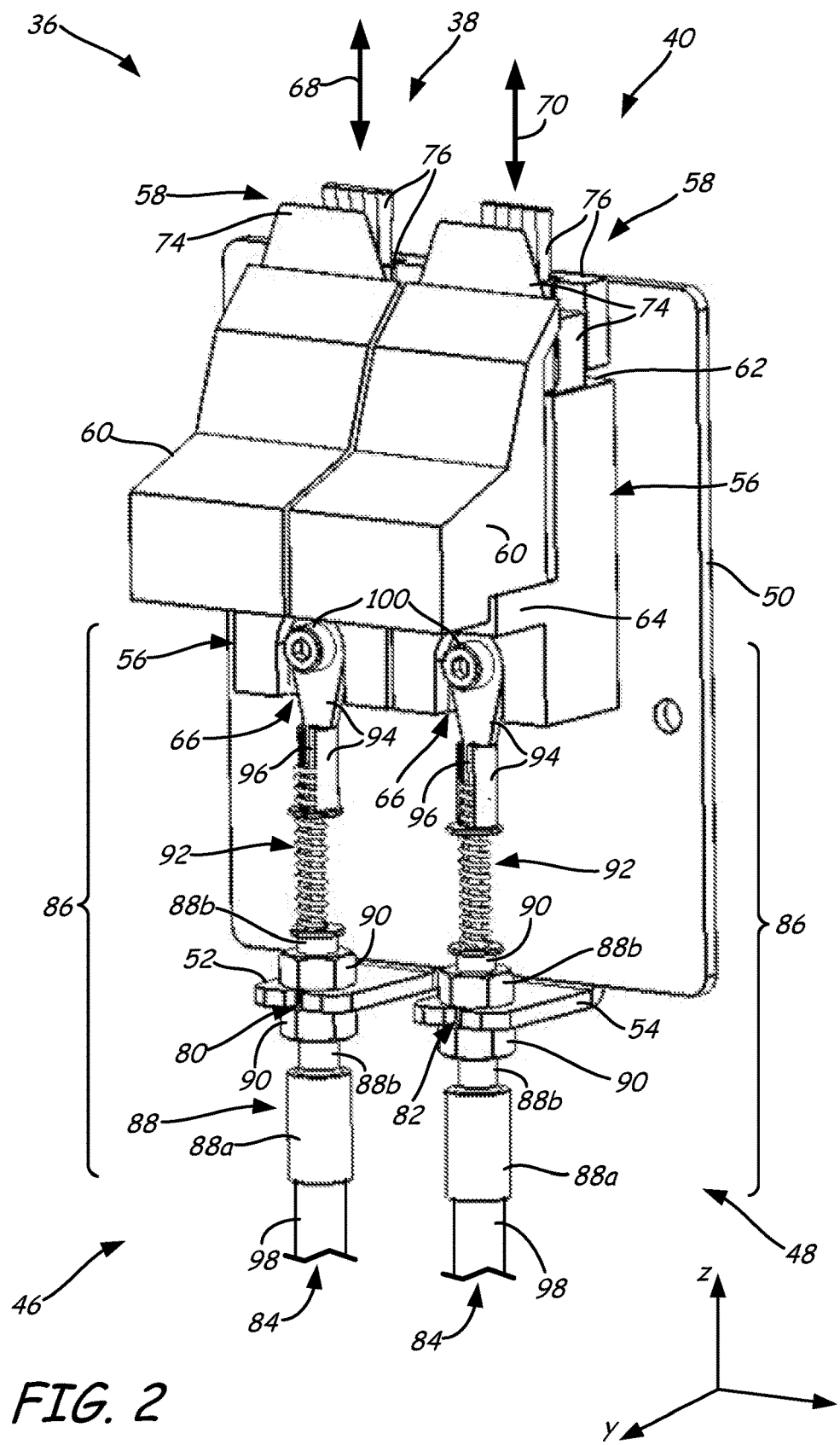
FIG. 2 is a front perspective view of the purge station.

As shown in FIG. 2, wiper assemblies 38 and 40 may be slidably mounted to base bracket 50. Base bracket 50 itself may be secured to a wall of system 10, such as a wall of chamber 18, allowing purge station 36 to be rigidly secured within chamber 18 at the intended purge area. Preferably, base bracket 50 is mounted at a height along the z-axis such that the height adjustments made to wiper assemblies 38 and 40 for alignment with nozzle tips 30a and 30b may each be small and focused.

Base bracket 50 may also include a pair of retention arms 52 and 54 extending substantially perpendicular to base bracket 50. Base bracket 50 and retention arms 52 and 54 may be integrally fabricated from a single stock preform, where retention arms 52 and 54 may be bent or otherwise shaped to the shown arrangement. Alternatively, retention arms 52 and 54 may be separate components secured to base bracket 50 with fasteners. Accordingly, base bracket 50 and retention arms 52 and 54 may be fabricated from any suitable materials that are preferably capable of withstanding the elevated temperatures in chamber 18 without deforming, such as one or more metallic materials (e.g., stainless steel).

In the shown embodiment, wiper assemblies 38 and 40 each include a slide mount 56, a contact head 58, and a purge ledge 60. Slide mounts 56 are each a block, bracket, or other suitable rigid frame that is configured to retain and support contact head 58 and/or purge ledge 60, as shown. For example, each slide mount 56 may include a top end 62, a front shelf 64, and an attachment location 66.

Each contact head 58 may be mounted on top end 62 of its respective slide mount 56, such as with one or more alignment pins or other retention mechanisms (e.g., pins 72, shown below in FIG. 3). Each contact head 58 is the portion of wiper assembly 38 or 40 that physically interacts with nozzle tip 30a or 30b, and may include flicker plate 74 and brush 76, where flicker plate 74 is disposed in front of brush 76 along the y-axis. This allows contact head 58 to remove excess materials from nozzle tip 30a or 30b during the tip cleaning step of the purge operation, such as discussed in Turley et al., U.S. Pat. No. 7,744,364.

Each purge ledge 60 may be mounted on front shelf 64 of its respective slide mount 56, such as with one or more alignment pins or other retention mechanisms (e.g., pin 78, shown below in FIG. 3). In alternative embodiments, purge ledges 60 may be secured to base bracket 50 in a secured manner such that purge ledges 60 do not move with slide mounts 56 and contact heads 58.

Figure 3:
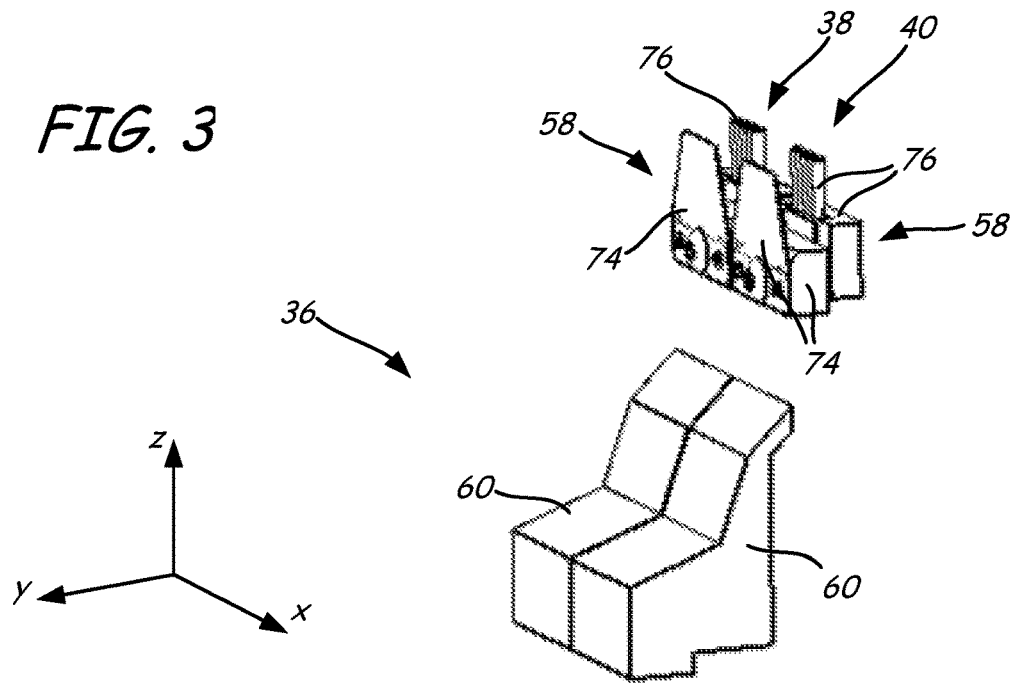
FIG. 3 is an exploded side perspective view of the purge station.
Figure 3:
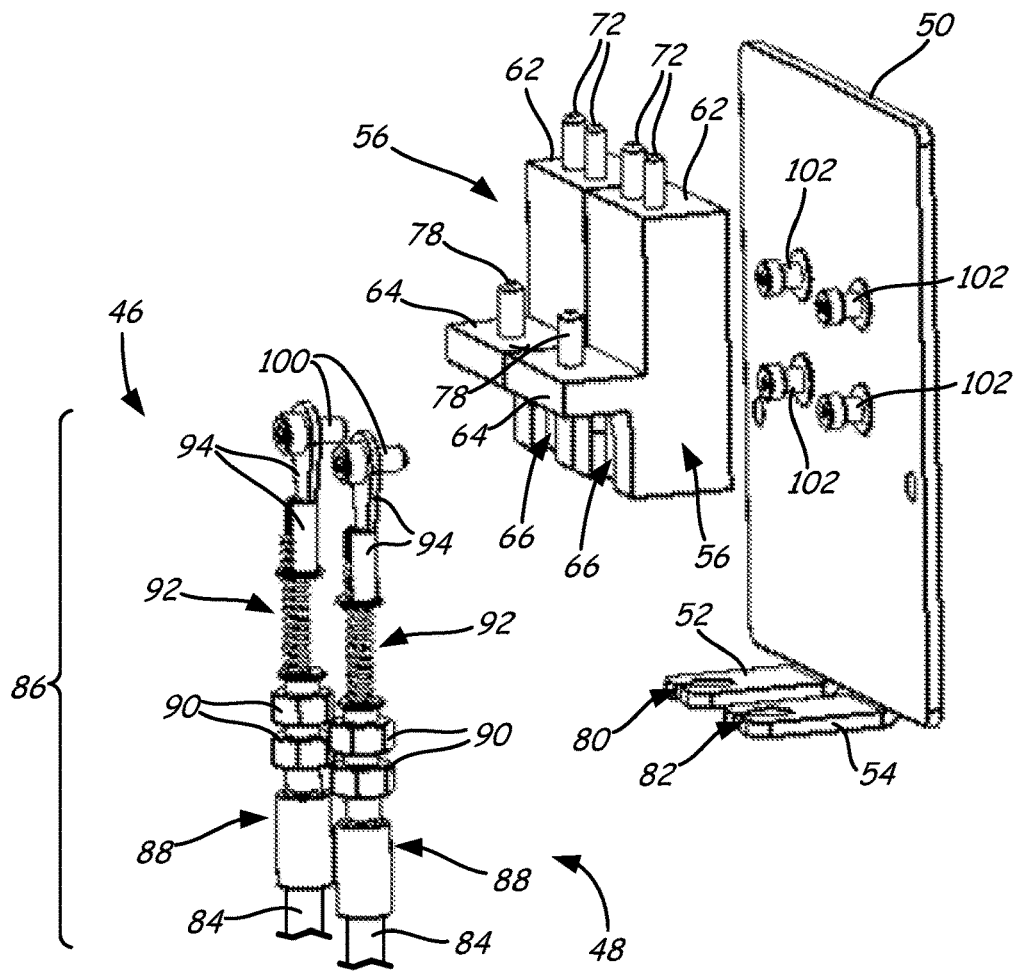

As further shown in FIGS. 2 and 3, retention arms 52 and 54 respectively include slots 80 and 82. Correspondingly, cable lines 46 and 48, which interconnect purge station 36 and panel 42 (shown above in FIG. 1) may each include a conduit portion 84 that terminates at a station connection adapter 86. Each connection adapter 86 may accordingly include end fitting 88 (having inlet portion 88a and threaded portion 88b), bracket clamp 90, spring 92, and retention eyelet 94, each of which is preferably fabricated from materials that are capable of withstanding the elevated temperatures in chamber 18.

Each conduit portion 84 of cable lines 46 and 48 may include an internal cable 96 and an exterior cable housing 98, where cable housing 98 may be secured to inlet portion 88a of its respective end fitting 88. In comparison, cable 96 preferably passes freely through an interior channel of end fitting 88, and further through bracket clamp 90 and biasing spring 92, to be secured to retention eyelet 94.

Each bracket clamp 90 is a mechanism that secures end fitting 88 to slot 52 or 54 of base bracket 50. For example, bracket clamp 90 may include a dual jam nut arrangement, as shown, where threaded portion 88b of end fitting 88 may extend through slot 52 or 54, and be secured therein with opposing jam nuts of bracket clamp 90.

Spring 92 is configured to bias retention eyelet 94 apart from end fitting 88, thereby pulling slack out of cable 96. This can assist in maintaining lash-free height adjustments for wiper assemblies 38 and 40. Each retention eyelet 94 may be secured to its respective slide mount 56 at attachment location 66, such as with the use of engagement bolt 100. Each attachment location 66 preferably offsets connection adapter 86 of the respective cable line 46 or 48 from base bracket 50 for x-y alignment with slot 80 or 82.

As discussed below, an operator may use panel 42 to independently adjust the length of each cable 96. In preferred embodiments, each cable 96 is axially incompressible, allowing axial or longitudinal movements of cable 96 to move the respective wiper assembly 38 or 40 without compressing or stretching cable 96. However, each cable 96 is also preferably flexible enough to bend from panel 42 to purge station 36 without plastically deforming or fracturing.

During use, if the length of a given cable 96 is shortened, this pulls retention eyelet 94 downward along the z-axis against the bias of spring 92. This accordingly lowers slide mount 56, and its associated contact head 58 and purge ledge 60. Alternatively, if the length of the given cable 96 is increased, this pushes retention eyelet 94 upward along the z-axis. This accordingly raises slide mount 56, and its associated contact head 58 and purge ledge 60.

Figure 4:
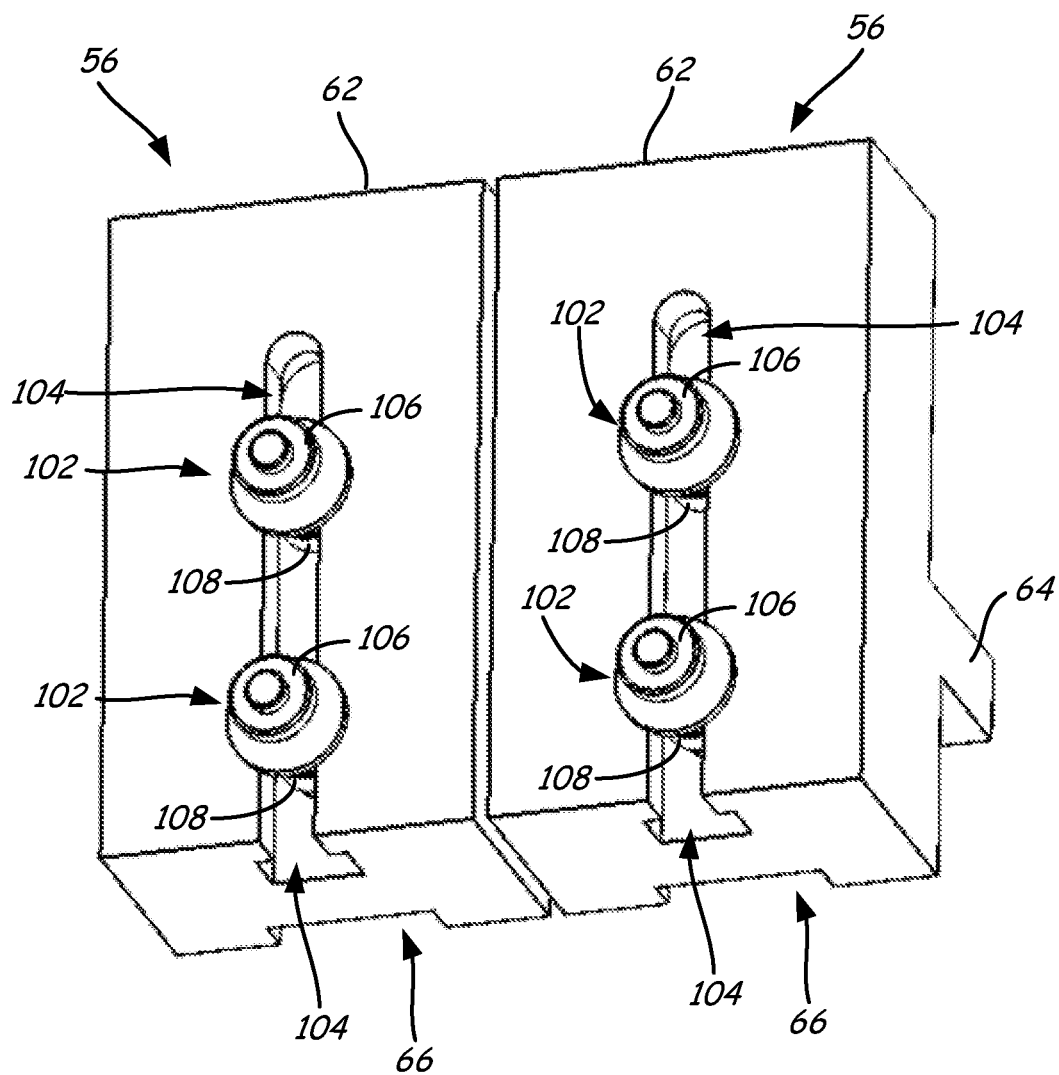
FIG. 4 is a rear bottom perspective view of two adjustment slides of the purge station.
Figure 4:
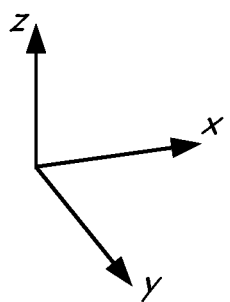

As further shown in FIGS. 3 and 4, base bracket 50 may retain one or more guide pins 102 or other guide members for engagement with each slide mount 56. In particular, as shown in FIG. 4, each slide mount 56 may include one or more elongated slots 104 that can engage with guide pins 102. Guide pins 102 and slots 104 (or other guide members) allow each slide mount 56 to be independently moved along the z-axis, while also preferably preventing movements along the x-axis or the y-axis, or any pivoting movements.

Each guide pin 102 preferably includes a base portion 106 for mounting to base bracket 50, and an enlarged head 108 (e.g., a bolt head) that slidably locks into slot 104. For instance, as shown in FIG. 4, each slot 104 may have a T-shaped cross-section that prevents the enlarged heads 108 of guide pins 102 from laterally slipping out of the given slot 104, but allows slide mount 56 to move along the z-axis relative to guide pins 102.

Figure 5:
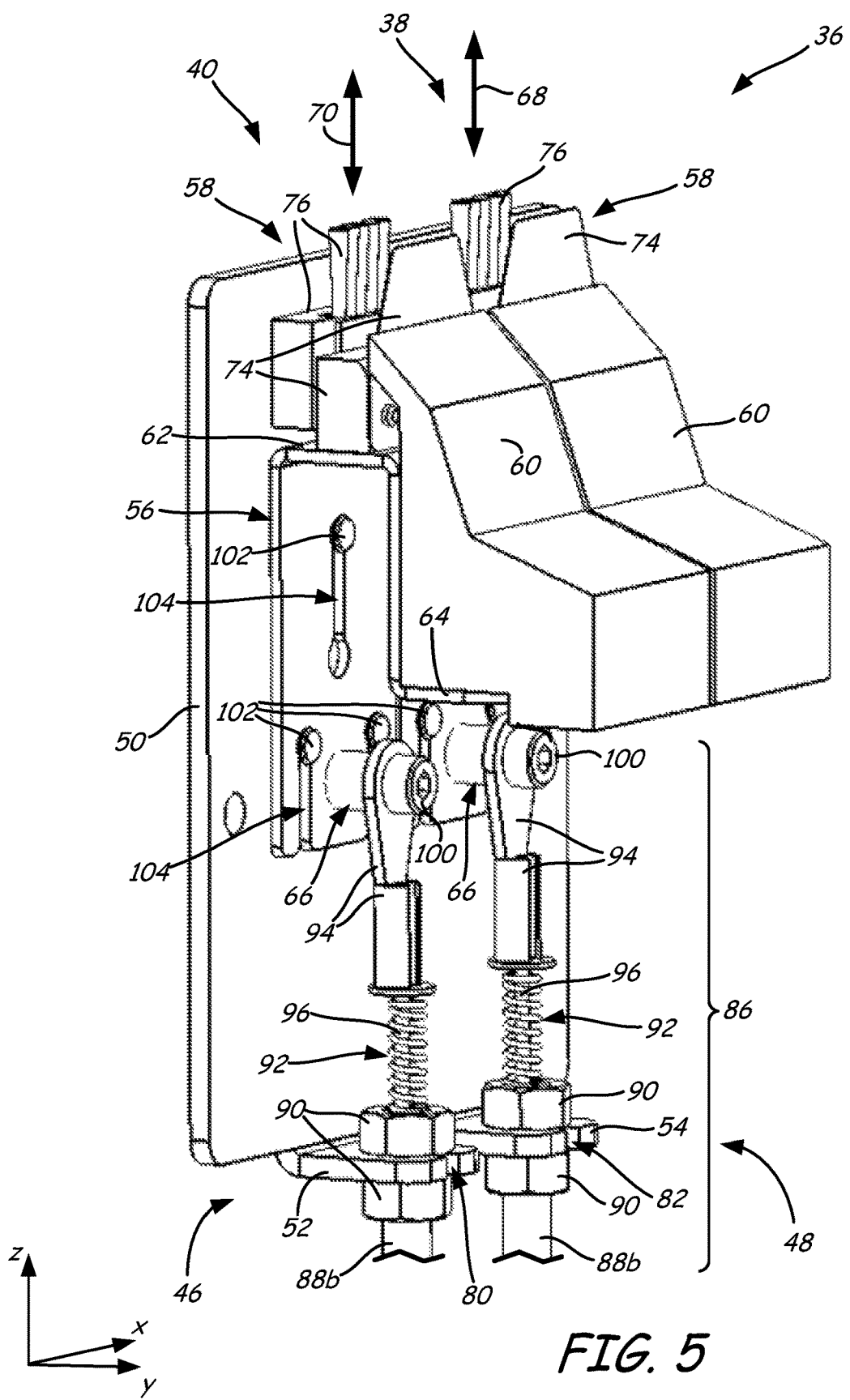
FIG. 5 is a side perspective view of the purge station, depicting alternative adjustment slides.

Alternatively, as shown in FIG. 5, slide mounts 56 may have any suitable geometry for retaining contact heads 58 and purge ledges 60, and for slidable engagements with base bracket 50. In this example, each slide mount 56 has a bent frame design with three slots 104, each being engaged with one of the guide pins 102. Accordingly, each slide mount 56 may include one or more slots 104, where each slot 104 may slidably engage with one or more guide pins 102. Preferably, each slide mount 56 engages with two or more guide pins 102 to prevent slide mount 56 from pivoting in the x-z plane or in the y-z plane, and to provide smooth, low-resistance sliding movements along the z-axis.

Figure 6:
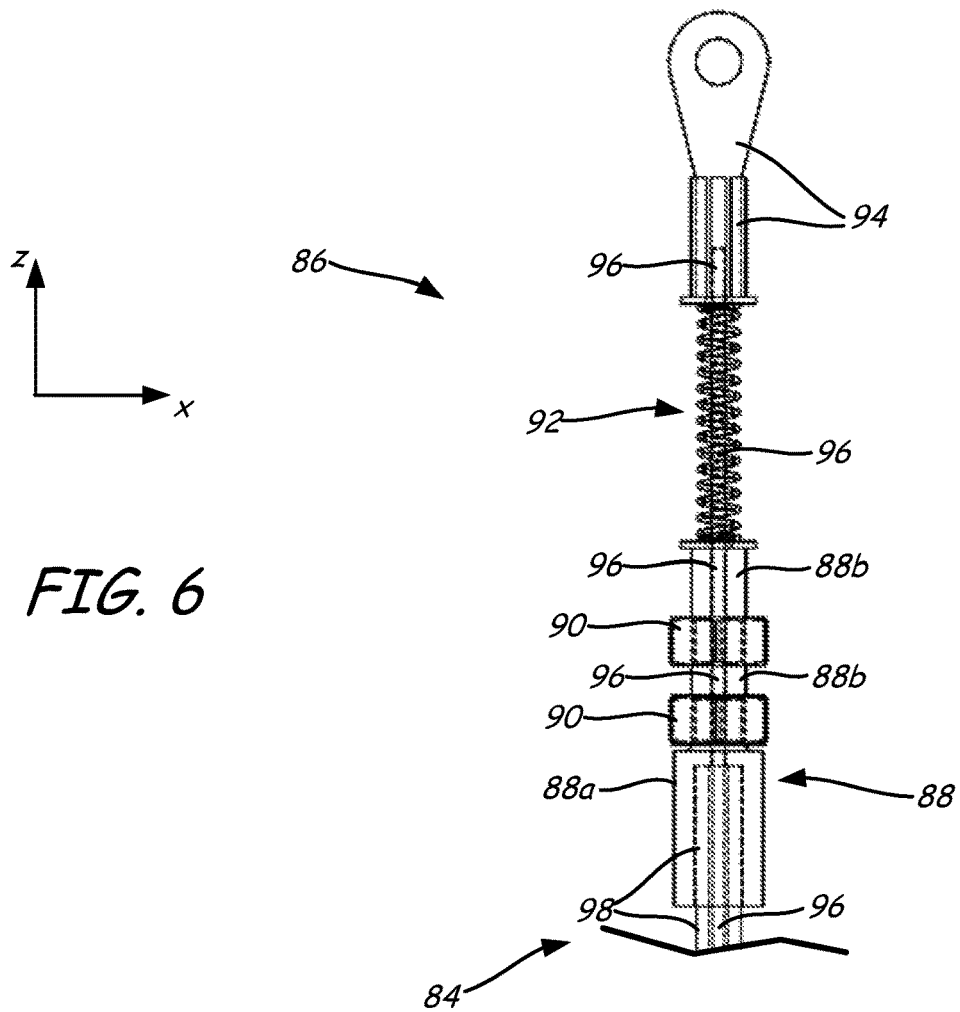
FIG. 6 is a front view of a station end portion of a cable line for the purge station.

FIG. 6 further illustrates the engagement between conduit portion 84 and connection adapter 86 of one of cable lines 46 and 48. As shown, the end of cable housing 98 may extend inside of inlet portion 88a (of end fitting 88) for a secure attachment, such as with an adhesive, crimping, and the like. Additionally, cable 96 is shown extending through end fitting 88, spring 92, and into retention eyelet 94, where it may be secured (e.g., adhered, crimped, and/or welded). As such, this end of cable 96 extends outside and beyond cable housing 98 for attachment to retention eyelet 94.

This arrangement allows cable 96 to axially move or pass freely through end fitting 88, bracket clamp 90, and cable housing 98 to pull or push retention eye 94 relative to end fitting 88 and bracket clamp 90. This correspondingly pulls or extends retention eye 94 relative to base bracket 50 to adjust the height of slide mount 56, which lowers or raises flicker plate 74 and brush 76 of contact head 58 relative to the respective nozzle tip 30a or 30b.

Figure 7:
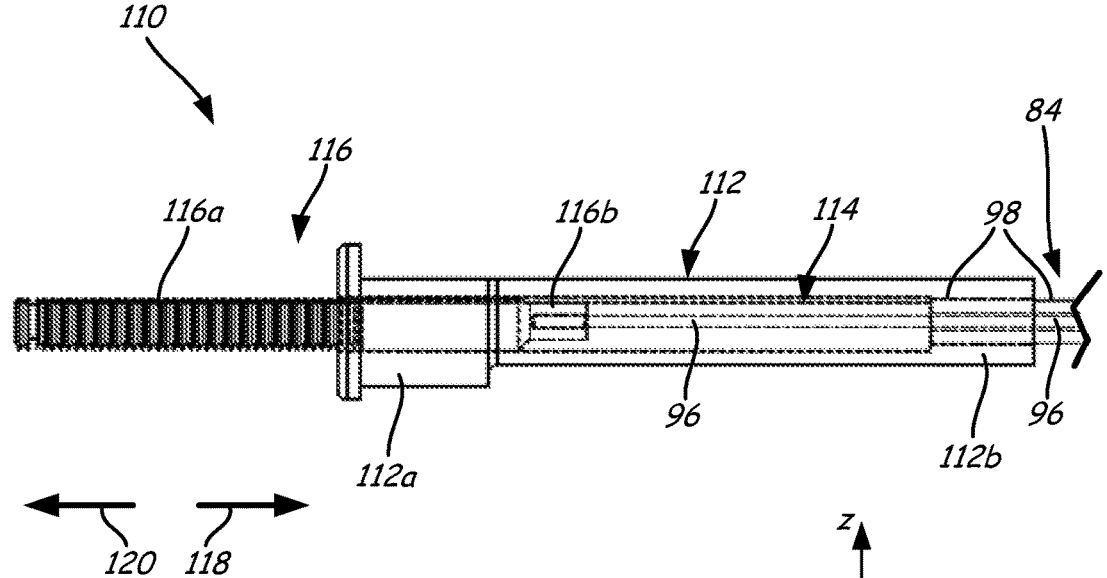
FIG. 7 is a front view of a panel end portion of the cable line.

FIG. 7 illustrates the opposing end of cable line 46 or 48, which is located at panel 42, and is referred to as panel connection adapter 110. In the shown example, connection adapter 110 includes an end shaft 112 (having a first end 112a, a second end 112b, and internal passage 114) and drive screw 116 (having externally-threaded portion 116a and connection portion 116b). Cable housing 98 extends into second end 112b of end shaft 112, where it may be secured, such as with an adhesive. Cable 96 itself may extend outside and beyond this end of cable housing 98 and through internal passage 114, where it may be secured to connection portion 116b of drive screw 116, such as with an adhesive, crimping, and the like.

Threaded portion 116a of drive screw 116 extends into first end 112a of end shaft 112, such that connection portion 116b resides within internal passage 114 for engagement with cable 96. This arrangement allows drive screw 116 to slide through internal passage 114 in the directions of arrows 118 and 120. Movement of drive screw 116 in the direction of arrow 118 correspondingly pushes cable 96 in the same direction through end shaft 112 and cable housing 98 for pressing slide mount 56 of wiper assembly 38 or 40 (shown above in FIGS. 2-5) upward. Alternatively, when drive screw 116 is moved in the direction of arrow 120, this pulls cable 96 in the same direction through end shaft 112 and cable housing 98 for pulling slide mount 56 of wiper assembly 38 or 40 downward.

Figure 8:
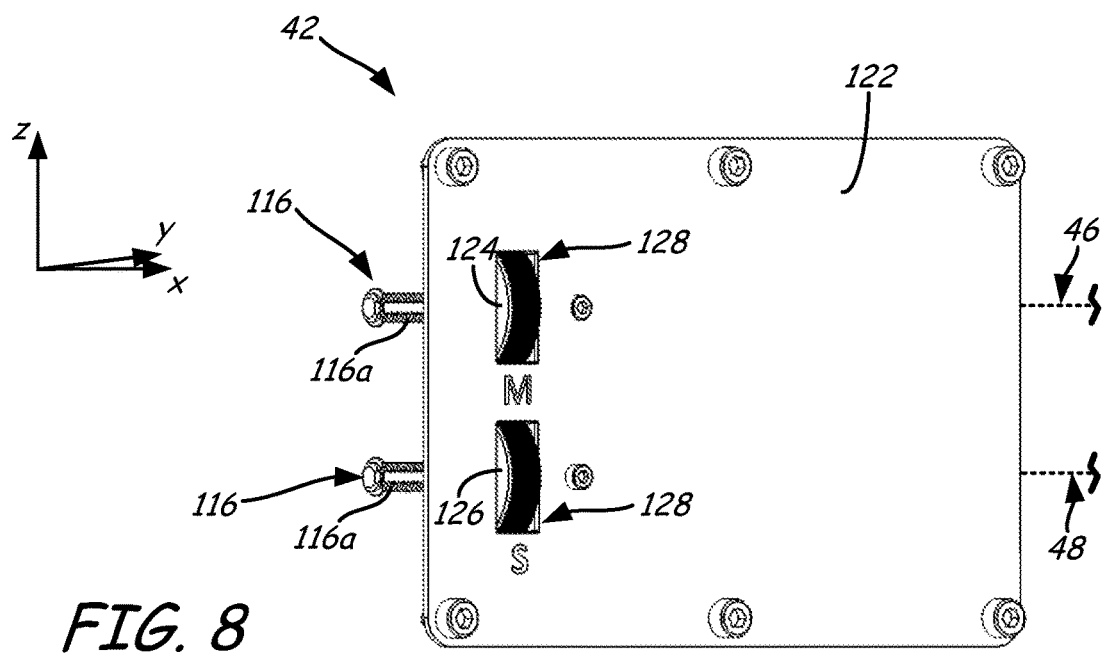
FIG. 8 is a front perspective view of an operator panel for the purge station in use with panel end portions of two cable lines.
Figure 9:
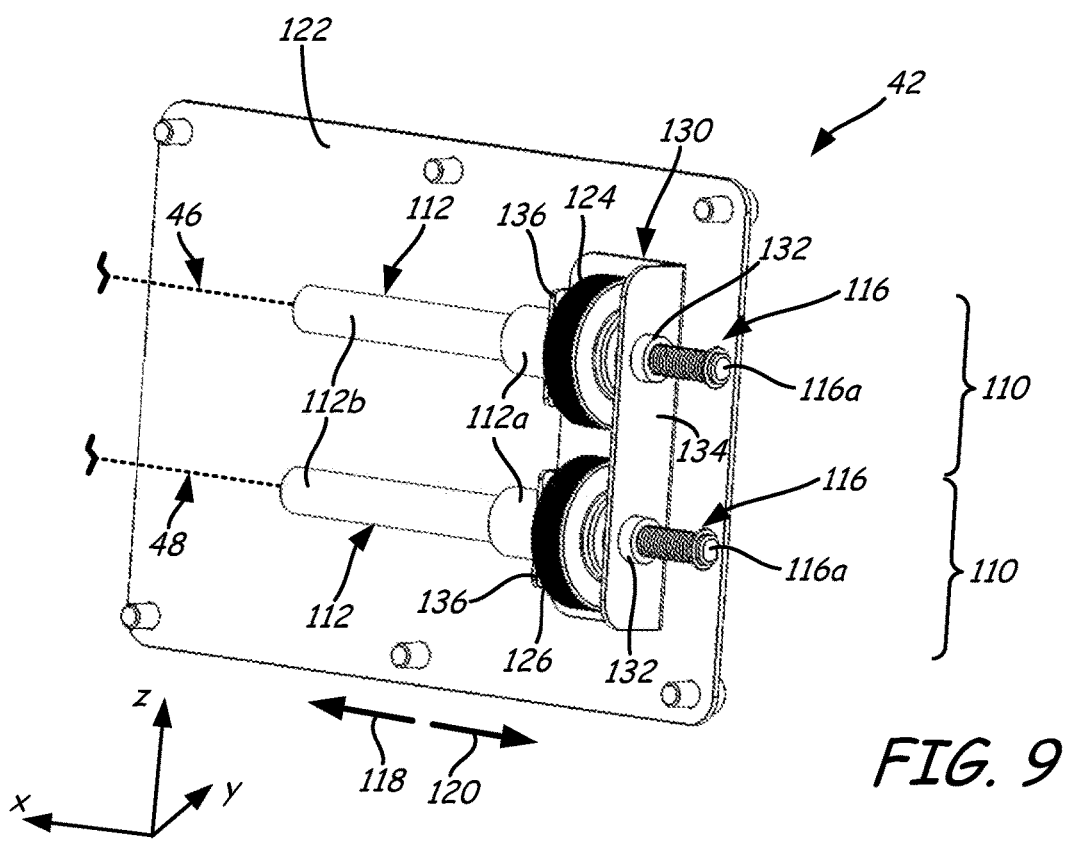
FIG. 9 is a rear perspective view of the operator panel in use with the two panel end portions.
Figure 10:
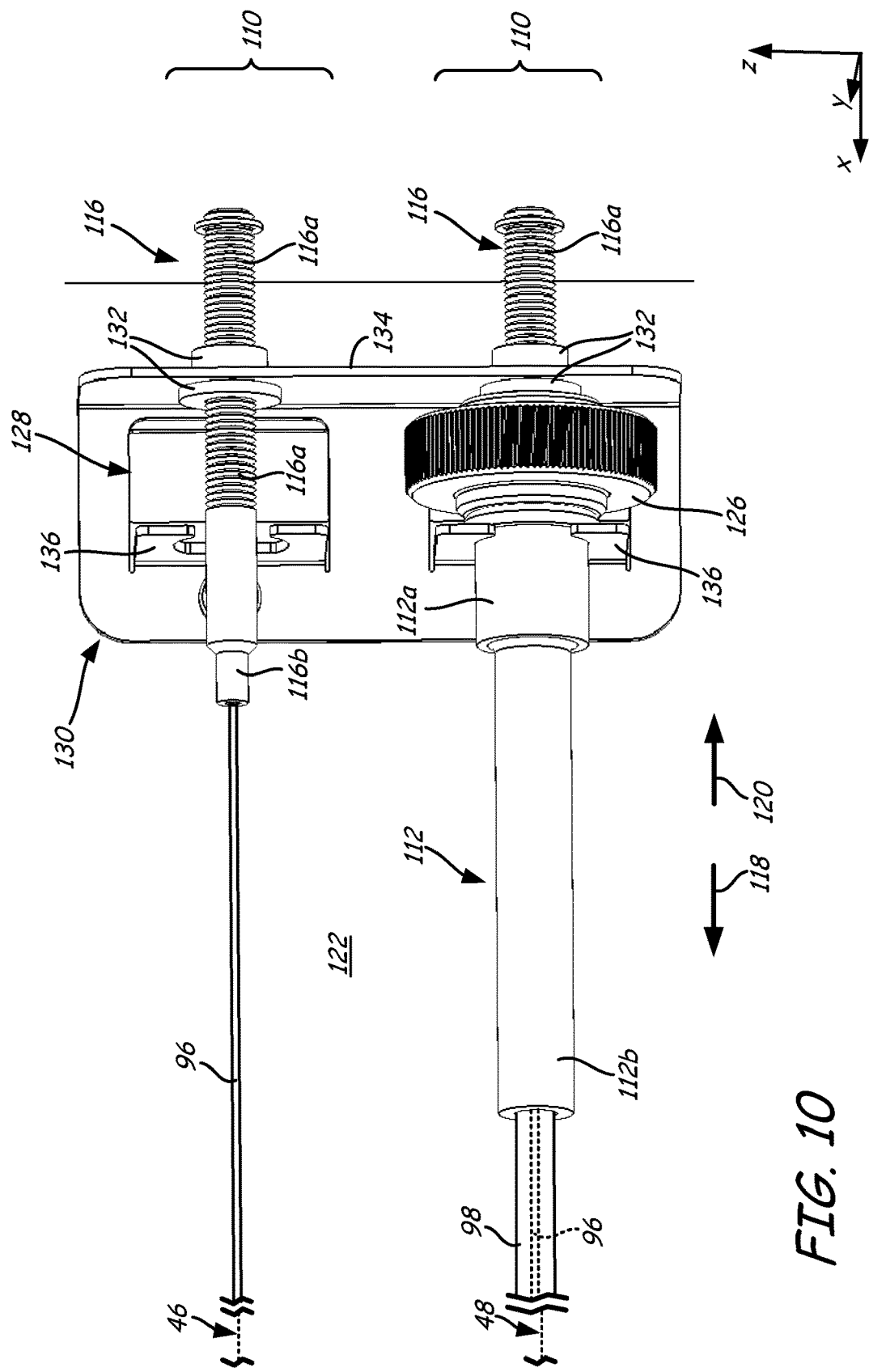
FIG. 10 is an expanded rear view of the operator panel and the two panel end portions, where an adjustment wheel and end housing of one of the panel end portions is omitted for ease of discussion.

FIGS. 8-10 illustrate an example embodiment for panel 42 and its engagements with connection adapters 110 of cable lines 46 and 48. As shown in FIG. 8, panel 42 may include mounting plate 122 and adjustment wheels 124 and 126, where adjustment wheels 124 and 126 extend through openings 128 of mounting plate 122 for operator access. Mounting plate 122 may be secured to any suitable location of system 10 (e.g., at housing 44), and is preferably secured at a convenient location for operator access.

As shown in FIGS. 9 and 10, panel end portions 110 and adjustment wheels 124 and 126 may be supported by mounting plate 122 with the use of bracket 130 and a pair of bracket sleeves 132. In particular, bracket 130 may include a base retention flange 134 and a pair of support retention flanges 136, where adjustment wheels 124 and 126 may be rotatably mounted between them on threaded portion 116a of drive screw 116. In alternative embodiments, bracket 130 may include any suitable design for retaining connection adapters 110 and adjustment wheels 124 and 126.

FIG. 10 depicts the same arrangement as shown in FIG. 9, where cable housing 98 and end shaft 112 for cable line 48 are omitted for ease of discussion. As shown, bracket sleeves 132 may extend through base retention flange 134, and may optionally function as anti-rotation devices for preventing drive screws 116 from freely rotating.

Adjustment wheels 124 and 126 may be positioned between retentions flanges 134 and 136, and end housings 112 may be secured to support retention flanges 136 (e.g., with a snap-fit engagement), such that each bracket sleeve 132, the respective adjustment wheel 124 or 126, and end shaft 112 are axially aligned. Each drive screw 116 may then be inserted through bracket sleeve 132 and adjustment wheel 124 or 126, and into internal passage 114 of end shaft 112 at first end 112a.

Adjustment wheels 124 and 126 each preferably include an internally-threaded surface for engaging threaded portion 116a of drive screw 116. As such, the rotations of adjustment wheels 124 and 126 move the respective drive screws 116 (due to the threaded engagements) in the directions of arrows 118 and 120 relative to end housing 112 and bracket 130. This can correspondingly move each cable 96 in the directions of arrows 118 and 120, as discussed above, to adjust the heights of wiper assemblies 38 and 40 at purge station 36.

For example, to raise the height of wiper assembly 38 along the z-axis relative to the height of nozzle tip 30a, a user may rotate adjustment wheel 124 in a first rotational direction, which moves drive screw 116 in the direction of arrow 118 due to their threaded engagement. This correspondingly pushes cable 96 in the same direction through end shaft 112 and cable housing 98. At station connection adapter 86, the movement of cable 96 presses retention eyelet 94 upward, which presses slide mount 56 of wiper assembly 38 upward relative to base bracket 50 due to the sliding engagements between guide pins 102 and slots 104.

Alternatively, to lower the height of wiper assembly 38 along the z-axis relative to the height of nozzle tip 30a, a user may rotate adjustment wheel 124 in the second and opposing rotational direction to move drive screw 116 in the direction of arrow 120. This pulls cable 96 in the same direction through end shaft 112 and cable housing 98. At station connection adapter 86, the movement of cable 96 pulls retention eyelet 94 downward (against the bias of spring 92), which pulls slide mount 56 of wiper assembly 38 downward relative to base bracket 50 due to the sliding engagements between guide pins 102 and slots 104.

The same processes may be independently performed with adjustment wheel 26 to adjust the height of wiper assembly 40 along the z-axis relative to the height of nozzle tip 30b. The larger outer diameters of adjustment wheels 124 and 126 relative to the outer diameters of drive screw 116 allow very small height adjustments to be made even with full rotations of adjustment wheels 124 and 126. This allows the heights of wiper assemblies 38 and 40 to be adjusted with high precisions.

While illustrated with the above-embodied architecture, cable lines 46 and 48 may adjust the heights of wiper assemblies 38 and 40 using any suitable mechanism. For instance, in some embodiments, adjustment wheels 124 and 126 may be secured to drive screws 116 (rather than with threaded engagements). In these embodiments, the rotation of drive screws 116 can generate rotational torque on cables 96, which can also rotate. At station connection adapters 86, each retention eyelet 94 can be replaced with a threaded screw or gear that can rotate under the applied rotational torque from cable 96. The threaded screw or gear may be engaged with a second gear mounted to slide mount 56 that can raise or lower slide mount 56 based on the rotational direction of the second gear.

Figure 11:
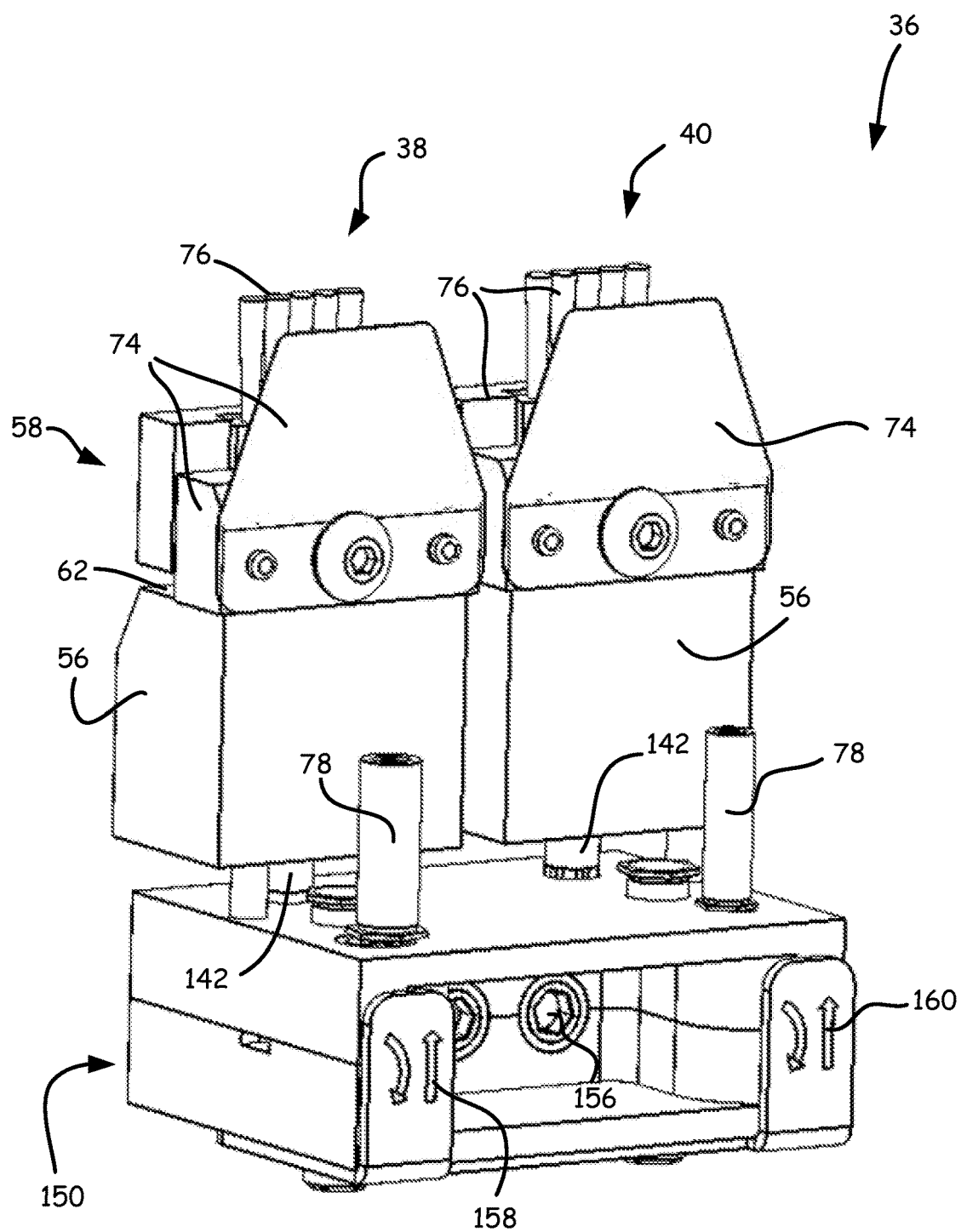
FIG. 11 is a front perspective view of an alternative embodiment of the purge station.
Figure 12:
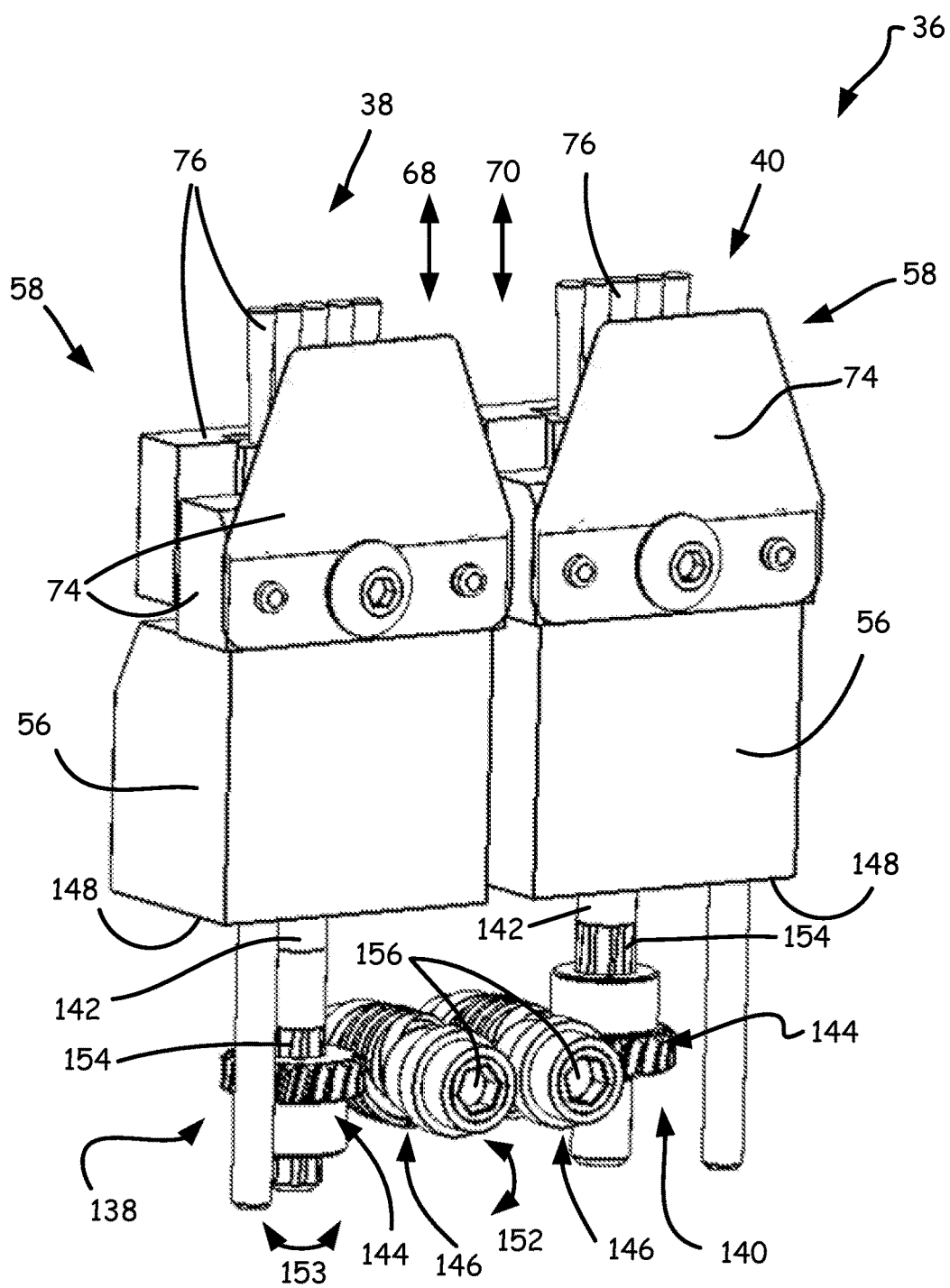
FIG. 12 is a front perspective view of the alternative embodiment of the purge station depicting the adjustment assembly.

In an alternative embodiment as illustrated in FIGS. 11-12, cable lines 46 and 48 may be replaced with gear assemblies 138 and 140. For instance, gear assemblies 138 and 140 for adjusting the height of wiper assemblies 38 and 40 are worm drive assemblies. As shown in FIG. 11, the base bracket 50 described previously above may alternatively comprise a mounting station 150 where wiper assemblies 38 and 40 may be slidably mounted to mounting station 150. Similarly to base bracket 50, mounting station 150 itself may be secured to a surface of system 10, such as a wall or floor of chamber 18, allowing purge station 36 to be rigidly secured within chamber 18 at the intended purge area. Preferably, mounting station 150 is also mounted at a height along the z-axis such that the height adjustments made to wiper assemblies 38 and 40 for alignment with nozzle tips 30a and 30b may each be small and focused.

As shown in FIG. 12, in which the mounting station 150 has been omitted for purposes of illustration, each gear assembly 138 and 140 includes drive screw 142 operably connected to gear 144. Gear 144 is operably connected to end fitting 146, for instance, a worm end fitting 146. End fitting 146 is positioned at approximately a 90 degree angle with respect to the slide mount 56 adjustment directions which are indicated by arrows 68 and 70. The gear assemblies 138 and 140 may alternatively comprise bevel gears, a rack and pinion system, or wedges.

In this embodiment, drive screw 142 is positioned with a drive axis approximately 90 degrees to a drive axis of gear 144. Gear 144 is operably connected with the drive screw 142 by meshing of the gear 144 with threaded length of the drive screw 142. The drive screw 142 extends to engagement with lower or bottom surface 148 of slide mount 56. Rotating fitting 146 in the direction of arrow 152 thus causes gear 142 to rotate in the direction of arrow 153, which in turn causes drive screw 142 to move slide mount 56 in the direction of arrows 68 and 70. For each rotation of end fitting 146, gear 144 may advance the distance of approximately one tooth of gear 144 which moves drive screw linearly along represented by arrows 158 and 160 a distance of approximately 0.008 inches, allowing gear assemblies 138 and 140 to adjust the vertical position of contact heads 58 with precision.

Gear assembly 138 and 140 also allows for a reduction in rotational speed of gear 144 while allowing for greater torque transmission between gear 144 and drive screw 142. Alternative gear reduction ratios may be utilized depending on gear set and size incorporated into gear assembly 138 and 140. Thus, gear assembly 138 and 140 all rotational movement of gear 144 to translate into precise linear movement of slide mounts 56 which allows for both coarse and fine tuning of the vertical position of contact heads 58.

Gear 144 may also comprise a small helix angle and high friction coefficient allowing the secure adjustment of contact heads 58 by preventing gear 144 from being back driven. Gear assembly 138 and 140 allow gears 144 to retain rotated position with each turn of drive screw 142. Drive screw 142 is correspondingly adapted with a small friction angle on screw threads as well as friction locking spring element 154 to prevent unwanted movement of slide mounts 56 and contact heads 58 which can result from vibrational and thermal forces generated by the system 10 during operations.

To raise and or lower slide mounts 56 and thus contact heads 58, end fittings 146 are configured with connection ends 156 for receiving an adjustment tool (not shown). Ends 156 are configured for receipt and engagement with the adjustment tool, the adjustment tool being any one of a tool commonly used to access other areas or parts of the additive manufacturing system 10 and/or for servicing the system 10.

As such, the adjustments of wiper assemblies 38 and 40 can be accomplished with axial or longitudinal movements of cable 96 in the directions of arrows 118 and 120, or by rotating cable 96. Alternatively, the adjustments can be accomplished with axial or longitudinal movements of drive screw 142 in the direction of arrows 158 and 160, or by rotating end fitting 146 and gear 144. These mechanisms are particularly suitable for use with a heatable chamber 18 since the components of purge station 36 and station connection adapter 86 can be manufactured from strong, reliable materials that can withstand the elevated temperatures of chamber 18. Cable lines 46 and 48 and gear assemblies 138 and 140 also preferably allow an operator to mechanically adjust the heights of wiper assemblies 38 and 40 within chamber 18 without requiring electronic devices, such as electrical motors, which can otherwise be vulnerable to the elevated temperatures of chamber 18.

The proper heights of wiper assemblies 38 and 40 relative to nozzle tips 30a and 30b can be identified in a variety of manners. For example, in some embodiments, the heights of wiper assemblies 38 and 40 may be monitored visually, such as through a window into chamber 18. In this case, controller 14 may execute a setup routine that includes tool path routes that pass nozzle tips 30a and 30b back-and-forth over wiper assemblies 38 and 40. As the nozzle tips 30a and 30b pass over wiper assemblies 38 and 40, the operator rotating adjustment wheels 124 and 126 can visually inspect the height alignments of wiper assemblies 38 and 40 with nozzle tips 30a and 30b. Alternatively (or additionally), the height adjustments of wiper assemblies 38 and 40 can be confirmed with various height markers, such as a reference point or line may be provided on a glass pane or other media to visually set the heights of wiper assemblies 38 and 40.

In another alternative embodiment, the height adjustments of wiper assemblies 38 and 40 can be verified by passing an electrical current through purge station 36 and detecting the closed circuit through print head 20 when contact is made between wiper assemblies 38 and 40 (e.g., with flicker plates 74 and/or brushes 76) and nozzle tips 30a and 30b. Controller 14 may detect the closed electrical circuit and provide a visual and/or audible indicator that wiper assembly 38 and/or wiper assembly 40 is properly adjusted relative to nozzle tip 30a or 30b.

In another embodiment, adjustment wheels 124 and 126 may be operably connected to motorized drive components to eliminate the manual effort required in aligning the heights of wiper assemblies 38 and 40. This embodiment can be particularly useful in combination with the above-discussed closable electrical circuit detection. In this case, controller 14 may also command one or more electrical motors to rotate adjustment wheels 124 and 126 as needed until the closed electrical circuits are detected. This can also eliminate the step of visually inspecting the heights of wiper assemblies 38 and 40, and can further assist automating the printing operation with system 10.

In a further embodiment, chamber 18 may also include a camera (not shown) oriented to view purge station 36. This can eliminate the need for a line of sight between the operator and purge station 36. Additionally, the camera can also be configured for image recognition, thereby optionally eliminating the need of the closable electrical circuit or other sensor for verifying height alignments of wiper assemblies 38 and 40 with nozzle tips 30a and 30b.

Controller 14 may command print head 20 to undergo a purge operation at any suitable point in time, preferably when switching liquefier lines 28a and 28b between their stand-by and operating modes. However, the intervals for performing the purge operations may vary depending on the build parameters. For example, print head 20 may undergo a purging operation at periodic intervals to ensure that liquefier lines 28a and 28b and nozzle tips 30a and 30b are clean and ready.

As can be appreciated, the use of panel 42 for remote adjustments allows an operator to reposition the heights of wiper assemblies 38 and 40 at any desired time, even when system 10 is operating and chamber 18 is closed and heated, and regardless of vibrational and thermal forces associated with system 10. When set at their proper heights, wiper assemblies 38 and 40 are capable of effectively scrubbing and scraping off residual purge materials from nozzle tips 30a and 30b, thereby cleaning nozzle tips 30a and 30b prior to use in printing subsequent layers.

Although the present disclosure has been described with reference to preferred embodiments, workers skilled in the art will recognize that changes may be made in form and detail without departing from the spirit and scope of the disclosure.

The invention claimed is:

1. A method for adjusting a height of a purge station in an additive manufacturing system having a build chamber, the method comprising:
securing a base bracket within an interior space of the build chamber;
slidably securing a purge station to the base bracket;
coupling an actuator to the purge station wherein the actuator is located outside of the build chamber, wherein manipulating the actuator causes the purge station to be raised and lowered within the build chamber.

2. The method claim 1 and wherein coupling the actuator to the purge station comprises:
securing a first end of an axially incompressible cable to the purge station; and
coupling the axially incompressible cable to the actuator proximate a second end of the axially incompressible cable wherein the second end of the axially incompressible cable extends outside of the build chamber.

3. The method of claim 2 and wherein manipulating the actuator comprises:
rotating an adjustment wheel coupled to the axially incompressible cable in a first rotational direction which causes the axially incompressible cable to move in a first axial direction, resulting in the purge station being raised relative to the base bracket.

4. The method of claim 2 and wherein manipulating the actuator comprises:
rotating an adjustment wheel in a second rotational direction which causes the axially incompressible cable to move in a second axial direction, resulting in the purge station being lowered relative to the base bracket.

5. The method of claim 2, wherein coupling the axially incompressible cable to the actuator comprises:
attaching a drive screw to the axially incompressible cable; and
threadably engaging the drive screw to the actuator wherein rotation of the actuator causes axial movement of the axially incompressible cable.

6. The method of claim 2 and further comprising:
biasing the axially incompressible cable with a spring relative to the base bracket to reduce slack in the axially incompressible cable.

7. The method of claim 1 and further comprising:
heating the build chamber to a selected temperature.

8. The method of claim 1 and further comprising:
attaching a motor to the actuator wherein the motor moves the actuator.

9. The method claim 1 and wherein coupling the actuator to the purge station comprises:
coupling a first gear to the purge station; and
coupling a second gear to the actuator wherein the first and second gears are intermeshed such that manipulating the actuator in a first rotational direction results in linear movement of the purge station in a first linear direction.

10. The method of claim 9 and wherein manipulating the actuator in a second rotational direction results in linear movement of the purge station in a second linear direction.

11. A method for adjusting a height of a purge station in an additive manufacturing system having a build chamber, the method comprising:
securing a base bracket within an interior space of the build chamber;
slidably securing a purge station to the base bracket;
coupling an actuator to the purge station wherein the actuator is located outside of the build chamber, wherein rotational movement of the actuator causes linear movement of the purge station within the build chamber.

12. The method claim 11 and wherein coupling the actuator to the purge station comprises:
securing a first end of an axially incompressible cable to the purge station; and
coupling the axially incompressible cable to the actuator proximate a second end of the axially incompressible cable wherein the second end of the axially incompressible cable extends outside of the build chamber.

13. The method of claim 12 and wherein manipulating the actuator comprises:
rotating an adjustment wheel coupled to the axially incompressible cable in a first rotational direction which causes the axially incompressible cable to move in a first axial direction, resulting in the purge station being raised relative to the base bracket.

14. The method of claim 12 and wherein manipulating the actuator comprises:
rotating an adjustment wheel in a second rotational direction which causes the axially incompressible cable to move in a second axial direction, resulting in the purge station being lowered relative to the base bracket.

15. The method of claim 12, wherein coupling the axially incompressible cable to the actuator comprises:
- attaching a drive screw to the axially incompressible cable; and
- threadably engaging the drive screw to the actuator wherein rotation of the actuator causes axial movement of the axially incompressible cable.

16. The method of claim 12 and further comprising:
- biasing the axially incompressible cable with a spring relative to the base bracket to reduce slack in the axially incompressible cable.

17. The method of claim 11 and further comprising:
- heating the build chamber to a selected temperature.

18. The method of claim 11 and further comprising:
- attaching a motor to the actuator wherein the motor moves the actuator in the rotational direction.

19. The method claim 11 and wherein coupling the actuator to the purge station comprises:
- coupling a first gear to the purge station; and
- coupling a second gear to the actuator wherein the first and second gears are intermeshed such that manipulating the actuator in a first rotational direction results in linear movement of the purge station in a first linear direction.

20. The method of claim 19 and wherein manipulating the actuator in a second rotational direction results in linear movement of the purge station in a second linear direction.

\* \* \* \* \*